United States Patent
Bracewell et al.

(10) Patent No.: US 10,623,701 B1
(45) Date of Patent: Apr. 14, 2020

(54) SYSTEMS AND METHODS FOR FACILITATING CONTROL AND COMMUNICATION BETWEEN COMPUTING DEVICES AND PRESENTATION SYSTEMS

(71) Applicant: Facebook, Inc., Menlo Park, CA (US)

(72) Inventors: Peter John Richard Gilbert Bracewell, Menlo Park, CA (US); Howard William Winter, Romsey (GB); Oliver Pell, London (GB)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/116,885

(22) Filed: Aug. 29, 2018

(51) Int. Cl.
*H04N 7/14* (2006.01)
*H04N 7/15* (2006.01)
*G06F 13/10* (2006.01)

(52) U.S. Cl.
CPC ........... *H04N 7/152* (2013.01); *G06F 13/105* (2013.01); *H04N 7/142* (2013.01); *H04N 7/147* (2013.01)

(58) Field of Classification Search
CPC ........................................................ H04N 7/14
See application file for complete search history.

(56) References Cited

U.S. PATENT DOCUMENTS

| | | | | | |
|---|---|---|---|---|---|
| 5,214,785 | A | * | 5/1993 | Fairweather | G05B 19/0426 703/24 |
| 5,260,697 | A | * | 11/1993 | Barrett | G06F 3/038 345/173 |
| 5,305,449 | A | * | 4/1994 | Ulenas | G06F 3/023 345/160 |
| 5,717,428 | A | * | 2/1998 | Barrus | G06F 1/3215 345/168 |
| 5,870,626 | A | * | 2/1999 | Lebeau | G06F 13/385 710/11 |
| 6,065,075 | A | * | 5/2000 | Ryzin | G06F 13/4068 710/65 |
| 6,081,856 | A | * | 6/2000 | Comer | G06F 9/455 703/24 |
| 8,799,537 | B1 | * | 8/2014 | Zhu | G06F 13/385 710/14 |
| 9,197,023 | B2 | * | 11/2015 | Bar-Niv | H01R 27/00 |
| 9,904,323 | B2 | * | 2/2018 | DeCamp | G06F 1/1632 |
| 2006/0288388 | A1 | * | 12/2006 | Harris | G06F 1/1632 725/81 |
| 2008/0222326 | A1 | * | 9/2008 | Liu | G06F 3/023 710/62 |
| 2009/0187686 | A1 | * | 7/2009 | Goodart | G06F 3/0227 710/72 |
| 2011/0276619 | A1 | * | 11/2011 | Khan | H04L 67/141 709/203 |
| 2012/0203949 | A1 | * | 8/2012 | Benhard | G06F 13/14 710/303 |

(Continued)

*Primary Examiner* — Olisa Anwah
(74) *Attorney, Agent, or Firm* — FisherBroyles, LLP

(57) ABSTRACT

Disclosed is a system that includes a computing device, a presentation system, and a hardware module disposed between the computing device and the presentation system. The hardware module and the computing device each may be configured to exchange a signal that includes media data and emulated input/output ("I/O") data, audio/visual data ("A/V"); the hardware module may also be configured to supply power to the computing device. The signal and the supplied power may be communicated between the hardware module and the computing device over a single cable.

20 Claims, 7 Drawing Sheets

(56) References Cited

U.S. PATENT DOCUMENTS

| | | | |
|---|---|---|---|
| 2012/0284449 A1* | 11/2012 | Tung | G06F 3/023 710/316 |
| 2013/0332642 A1* | 12/2013 | Capezza | G06F 13/4081 710/304 |
| 2015/0186325 A1* | 7/2015 | Petrick | G06F 13/426 710/313 |
| 2015/0356045 A1* | 12/2015 | Soffer | G06F 13/4221 710/303 |
| 2016/0062924 A1* | 3/2016 | Lee | G06F 13/102 |
| 2016/0070670 A1* | 3/2016 | Engelen | H04L 63/105 710/46 |
| 2016/0092154 A1* | 3/2016 | Bourlier | G06F 3/1454 345/2.2 |
| 2017/0109020 A1* | 4/2017 | Sliter | G06F 3/04845 |
| 2017/0123649 A1* | 5/2017 | Clavel | G06F 3/04817 |
| 2017/0163771 A1* | 6/2017 | Richards | H04L 41/22 |
| 2017/0286343 A1* | 10/2017 | Rozic | G06F 13/385 |
| 2017/0351309 A1* | 12/2017 | Hartnett | H04L 12/10 |

* cited by examiner

SYSTEMS AND METHODS FOR FACILITATING CONTROL AND COMMUNICATION BETWEEN COMPUTING DEVICES AND PRESENTATION SYSTEMS

BACKGROUND

A meeting room is often used for presentations. During these presentations, individuals may rely on the use of laptop computers as well as input devices, such as computer mice, trackballs, and other pointing devices. These various computer input devices facilitate the operator's management of the presentation when compared to the use of only a keyboard.

Presentation devices, such as projectors or LCD displays external to the laptop computer, are often used during presentations for facilitating a view of slides, video, or other presentation content to an audience. An existing problem is that a computer-based presentation is managed or controlled from the laptop computer and the presenter must have access to his or her computer to manage the computer-based presentation. In addition, the setup for current computer-based presentations may be complex or confusing; the presenter may spend the first part of a presentation period attempting to supply power to the laptop, connect the laptop display to a large screen display/projector, and/or configure a keyboard, mouse, or other input device to manage or navigate through the presentation.

The instant disclosure, therefore, identifies and addresses a need for improved systems and methods for facilitating control and communication between computing devices and presentation systems and using a simplified interface for all of these needs.

SUMMARY

As will be described in greater detail below, the instant disclosure describes various systems and methods for facilitating control and communication between computing devices and presentation systems.

In one exemplary implementation, the present disclosure describes a system that includes a computing device, a presentation system, and a hardware module disposed between the computing device and the presentation system. The hardware module and the computing device each may be configured to exchange a signal that includes media data and emulated input/output ("I/O") data as well as audio/visual data ("A/V"). The hardware module may also be configured to supply power to the computing device. The signal and the supplied power may be communicated between the hardware module and the computing device over a single cable. The system may further comprise a video conferencing ("V/C") system exchanging media data and I/O data with the computing device, the media data and emulated I/O data being exchanged between the computing device and the hardware module over the signal including one or more I/O or emulated I/O protocols between the hardware module and the computing device.

In some examples, a computing device may exchange multiple signals comprising differing emulated or non-emulated I/O commands, media data, and power distribution signals communicated with an intermediary hardware apparatus in furtherance of one or more bi-directional communication paths between a presenter and a presentation apparatus. In some embodiments, a video conferencing (VC) system and the computing device may exchange media data and I/O commands. In other embodiments, media data and emulated I/O commands communicated between the computing device and the hardware apparatus may be configured to exchange media data and/or emulated I/O commands through one or more protocols, such as with a keyboard protocol, mouse protocol, voice activation protocol, video gesture protocol, etc. over a wired or wireless network in accordance with a connection to the presentation system. In some embodiments, the hardware apparatus may be configured to exchange roles between a host and a host device as will be further be described below. In some embodiments, the hardware apparatus may be configured for remote control access by the presenter, or any number of group members, either directly or remotely.

The aforementioned computing device may be configured to exchange data over a single cable. Examples of data communication rates may include, without limitation, data rates of up to 10 Gbps, data rates of up to 40 Gbps, or data rates above 40 Gbps.

In some embodiments the hardware apparatus may be cooled exclusively by a stationary heat sink without the need of a mechanically actuated fan. This can be beneficial in situations where it is adventitious to preserve power consumption and mediation of data rates.

In one exemplary implementation, the present disclosure describes a method that includes the steps of exchanging a number of differing emulated I/O commands between a computing device and an intermediary hardware apparatus, exchanging a media data feed between the computing device and the intermediary hardware apparatus, exchanging power distribution between the computing device and intermediary hardware apparatus, and relaying the plurality of emulated I/O commands, the media data feed, and the power distribution exchanged between the computing device and the intermediary hardware apparatus over a single cable.

In one exemplary implementation, the present disclosure describes a device that includes (a) a data module configured to communicate an audio/video (A/V) data feed between the device and a computing system, (b) a power distribution module configured to supply power to the computing system, and (c) an I/O communication protocol emulation module configured to emulate a number of I/O communication protocols exchanged between the device and the computing system. Further, each of the data module, power distribution module, and I/O communication protocol emulation module may interact with the computing system over a single cable.

The following description and the annexed drawings set forth in detail certain illustrative aspects of the disclosure. These aspects are indicative, however, of but a few of the various ways in which the principles of the disclosed method and system may be employed. Other advantages and novel features of the invention will become apparent from the following description of the invention when considered in conjunction with the drawings.

BRIEF DESCRIPTION OF THE DRAWINGS

The drawings illustrate generally, by way of example, but not by way of limitation, various exemplary implementations discussed in the present document.

DETAILED DESCRIPTION

Figure 1:
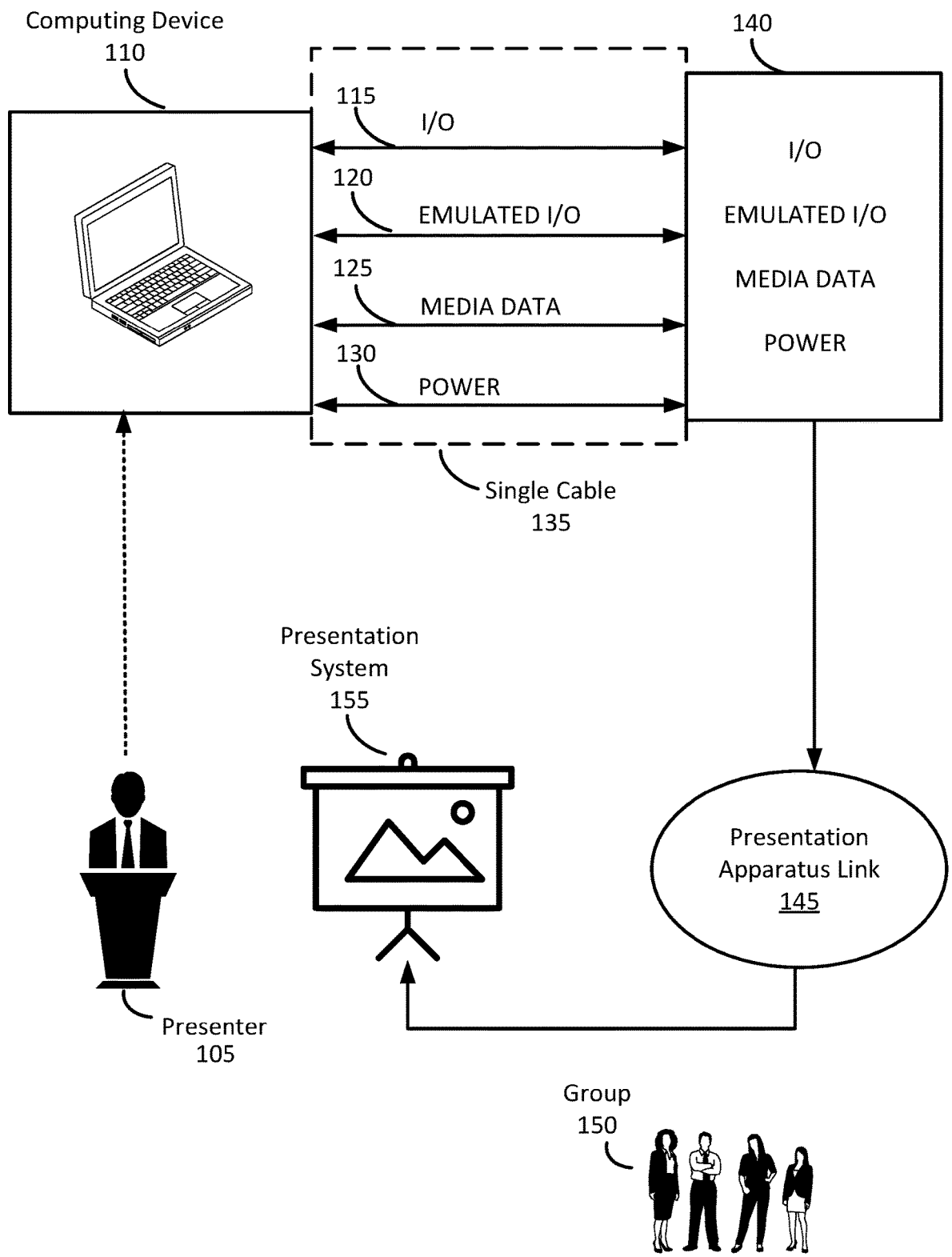
FIG. 1 illustrates a system for facilitating control and communication between a computing device and a presentation system in accordance with one exemplary implementation.

In the instant application, a hardware module is disclosed that operates along a communication path situated between a computing device (e.g., a laptop, desktop, tablet, smartphone, or any other computing device) and a presentation system (e.g., an audio/video display system such as a projector, monitor, audio speaker system, etc.). The hardware module may act as a central point of integration for video, audio, or input/output commands (I/O) or emulated I/O commands, etc., relieving a presenter from the requirement of providing numerous cables, electronic devices, or a keyboard or mouse. The hardware module may relay any of a variety of information, including, without limitation, media data (e.g., 4K video), optically modulated audio, I/O and/or emulated I/O information, voice activated control functions, touchscreen inputs, biometric security controls, gesture recognition, or any other number of media or I/O forms of information exchanged between the computing device to the presentation system.

In some examples, the hardware module may extract video and audio media feeds and/or files from the computing device and either pass them directly to the presentation system, or perform various forms of compression, file format conversion, or any other form of file processing. Additionally, the hardware module may be capable of receiving I/O or emulated I/O commands from the computing device. Furthermore, the hardware module may convert standard I/O commands to emulated I/O commands for a bi-directional exchange with either the computing device or the presentation system. In addition, in some examples, the hardware module may provide power to the computing device. In some embodiments, as later described, the hardware module may also act as either a host or host device.

In some embodiments, the information exchanged between the computing device and the hardware module may be relayed over a single cable. By utilizing a single cable, as stated above, numerous benefits may be realized. In addition to reducing the number of presentation preparation components required by a presenter, the hardware module may provide a familiar plug-and-play interface for the presenter. For example, the hardware module may provide an "On-the-Go" ("OTG") capability. Thus, some connections (e.g., USB cables, Ethernet cables, and/or some wireless connections) may interact with some computing devices (e.g., tablets, laptops, smartphones, etc.) according to an OTG specification. In these examples, the hardware module may act as a host, allowing other devices (e.g., USB-connected devices) to be attached as host devices. In some examples, systems described herein may allow a host and an attached device to switch between the roles of host and host-attached device. In addition, in some examples, systems described herein may enable a connected device to perform both master and slave roles, as discussed in greater detail below.

When two devices (such as USB compatible devices) are connected and at least one them is an OTG-compatible device, they may establish a communication link. In some examples, the device controlling the link may be referred to herein as the "master" or "host," while the other device may be referred to as the "host device," "slave," or "peripheral device." That is, the OTG standard may define two device roles: an OTG A-device and an OTG B-device, the standard specifying which side supplies power to the link, or specifying a bi-directional power exchange, and further specifying which device is the host. The OTG A-device may be a power supplier, and the OTG B-device a power consumer. In the default link configuration, the A-device may act as a host and the B-device may act as a peripheral. The host and peripheral modes may be exchanged later by using Host Negotiation Protocol (HNP). Each OTG device may exchange its role arbitrarily. The initial role of each device may be determined by which mini plug a user inserts into its receptacle.

The hardware module may further relieve the computing device (e.g., a laptop) of various processing requirements such that the computing device can be freed up to assume a more seamless role as an electronic presentation portal while handing off various routine processes to the hardware module. Some of the capabilities to perform these functions may lie in various protocol standards utilizing one or more twisted-pair data connections comprising one or more differential pair terminals. A differential pair may utilize a common differential floating ground to exchange differential voltage or current levels between the +/− ports as a signal balancing source to transmit or receive signals. These signals may then be conveyed, for example, over an operational amplifier, or simulated with software such as in a software radio. In either case, the input/output signals may be analog or digital. In some examples, the connection may further include one or more power bus and ground return connections for providing power at either end of the connection. Examples of standards used by the systems described herein may include, without limitation, a USB standard and/or an Ethernet standard.

In some examples, the connection used by the systems and methods described herein may provide a high power rating and/or a large amount of bandwidth to facilitate high-power, high-data-rate presentation systems (e.g., that may power devices such as laptops, tablets, etc. and/or that may transfer raw, uncompressed video). Examples may include, without limitation, USB-C (e.g., USB 3.x Type C) and Thunderbolt 3. In some examples, the connection used by the systems and methods described herein may transfer data without using a network protocol (and, e.g., the cable used by the systems and methods described herein may not be a network cable).

The hardware module may take I/O data and convert it into an emulated I/O format to provide to the presentation system. Alternatively, the hardware module may deliver emulated I/O data to the computing device. In some instances, the computing device itself may generate emulated I/O data; for example, a user logged in to the computing device remotely may be generating non-emulated I/O commands from a remote location, which the computing device in communication with the hardware module may convert into emulated I/O commands that may be then received by the hardware module. In an example, a video conferencing (VC) presentation system with audio, video, and I/O functionality might provide commands to the computing device to be passed on to the presentation system through the hardware module, which can accept streaming audio or video, or which may receive I/O or emulated I/O commands, etc.

In other instances, one or more attendees of a presentation may log in to the hardware module either directly or wirelessly to avoid consuming bandwidth on the computing device providing the media and/or I/O data for the presentation. In some other embodiments, the hardware module may act as a network server, hosting interactive and/or streaming web content in addition to the previously mentioned functionalities.

FIG. 1 illustrates a system for facilitating control and communication between a computing device 110 and a presentation system (presentation apparatus link 145 and presentation apparatus 155) in accordance with one exemplary implementation. The system may include a computing device 110, a single cable 135, a hardware module 140, and a presentation system comprised of a presentation apparatus link 145 and a presentation apparatus 155.

The presentation apparatus 155 may represent a system including multiple components, such as a video/audio display, an I/O or emulated I/O component 115/120 disposed to receive or dispatch I/O commands, and/or any other feature common to the presentation apparatus 155 and the hardware module 140 and the computing device 110. Additionally, the computing device 110 may be any number of computational devices such as a laptop, desktop, tablet, smartphone, etc. without exception. Media data 125 may refer to video data, audio data, etc. I/O data 115/120 may refer to any of the below mentioned forms of I/O or emulated I/O such as keyboard, mouse, touch screen, biometric sensory software, voice or facial activation controls, or and other form of I/O or emulated I/O control or feedback. The hardware module may include a passive and/or an active computational system, and, in some examples, may include a network of cloud computing servers or other networked computers performing serial or parallel computation processes over a network that includes other cloud-based computational architectures.

The single cable 135 may provide transmit media, power, and I/O data between hardware module 140 and computing device 110 in any of a variety of ways. For example, multiple differentially paired (e.g., twisted pairs) may be used to transport a large amount of data. Differential signaling may be used to electrically transmitting data across the cable using two complementary signals, where the same electrical signal is sent as a differential pair of signals, each in its own conductor. The pair of conductors can be wires (typically twisted pair) or traces on a circuit board. The circuit that receives the signal may respond to the electrical difference between the two signals, rather than the difference between a single wire and ground. Having a plurality of differential pairs may improve the data transfer rate between electronic devices such as the computational device 110, the hardware module 140 and the presentation system 155. Some technologies allow for numerous differential pair feeds in addition to power bus and ground return feeds to improve the data rate, or conversely match incoming data stream data rates with the data intake capabilities of the hardware module.

Once a presenter has initiated a contact between the computing device 110 and the hardware module 140, one or more of the systems described herein may determine device is the controlling (or master) device. For example, if computing device 110 is interacting with the hardware module 140, the hardware module 140 may determine whether it is a master device or a peripheral device.

The computing device 110 may be any suitable device. Examples of computing device 110 include, without limitation, a desktop computer, laptop computer, a mobile phone device, or a tablet computer. In various examples, the single cable 135 may be implemented as a USB-C cable or another type of cable that permits a computing device to form a bi-directional synchronous and/or asynchronous data transfer link while also exchanging power.

The hardware module 140 may be defined as custom-made computer-based processing platform for media centric applications, including video conferencing. The hardware module 140 may serve as a central hub for multiple computing devices and consolidates multiple functions into one hardware box.

The hardware module 140 may include a number of external connectors, including at least one of a USB connector, an Ethernet connector, a PoE connector, serial and GPIO connectors, 4 k video in and video out connectors, HDMI connectors, and/or wireless connections. The hardware module may include a motherboard that includes a CPU board or module, a video board or module, an audio board or module, a network (e.g., USB, Ethernet, or wireless) module, a WiFi interface, a power board, and a connector comprising bi-directional high data rate communication capacity, and an interface control module, and/or other circuitry. The connector may interface with a data or power feed channel and may be connected to a temperature sensor or a current sensor that measures the current load in the hardware module 140.

The hardware module 140 may be implemented as a processor-based or microprocessor-based system, such as for example, a system using microcontrollers, reduced instruction set computers (RISC), application specific integrated circuits (ASICs), field-programmable gate arrays (FPGAs), graphical processing units (GPUs), logic circuits, and any other circuit or processor capable of executing the control, power supply, load management, and communication functions described herein.

The presentation apparatus link 145 may be implemented as a wired or wireless connector or may include more than one of either or both of wired or wireless connections in a series of network hops. The presentation apparatus 155 may be implemented as a large LCD auxiliary or external device, digital projector, or other device or system that may be used to display a presentation to an audience.

The operation of the system of FIG. 1 will now be described in accordance with one implementation. In the presentation set up of FIG. 1, the computing device 110 may be connected to the hardware module 140 through a single cable 135. As previously stated, the single cable may correspond to any number of standards such as USB, PoE plus, or any other communication protocol capable of meeting the required functional abilities previously described. The hardware module 140 may connect to the presentation apparatus 155 through a presentation apparatus link 145. The presentation apparatus link may represent a wired connection and/or a combination of wired and wireless communication hops. In one implementation, the hardware module may be disposed in a hardware rack with a cable lead accessible to a presenter.

As illustrated in FIG. 1, the hardware module 140, through use of the cable 135, transmits power 130 to the computing device 110, exchanges media data 125 (e.g., presentation slides or audio/visual signals) with the computing device 110, and exchanges I/O 115 and emulated I/O 120 with the computing device 110. In one implementation, the hardware module 140 and the computing device 110 each may be configured to exchange a signal that includes media data and emulated I/O data. The signal may also include non-emulated I/O data.

The system of FIG. 1 may also include a video conferencing (VC) system exchanging media data and I/O data with the computing device 110. In one implementation, the hardware module 140 may be configured to exchange another signal with the presentation system, optionally over a wireless connection, which additionally includes other media data, such as a display feed or an audio feed.

In one implementation, the computing device 110 does not require a power cord, a video cable or a mouse—only the connection to the hardware module 140 through the cable 135. Thus, the system described simplifies the presentation setup process for a presenter 105. Through use of a single media/power distribution cable 135, the single cable 135 may supply media data and power to the computing device 110. In some embodiments, the single cable may relay functionality that can be capitalized by the hardware module, such as use of an alternate mode (e.g., the DisplayPort Alternate Mode ("DP alt_mode")) feature to extract the display output for display on presentation apparatus 155. DP alt_mode is a functional extension of some communication protocols enabling a cable to carry a plurality of signals. Alternate modes may represent optional capabilities that pertain to both connectors or ports that may allow signals for alternate standards (e.g., DisplayPort and Thunderbolt 3) to be transmitted. Knowing which devices and ports support the various alternate mode may be confusing and, at times, frustrating. Some alternate modes (e.g., DP alt_mode) may allow a suitably equipped computer to connect directly to a display or monitor in a plug-and-play configuration. The display device may have a recipient port to make this connection. In one example, the alternate mode (e.g., DP alt_mode) may be provided within a USB standard.

Additionally, in some examples the hardware module and/or the presenter computing device may provide on-the-go (OTG) functionality via the connection provided by the single cable. OTG may allow a device to act as a host, allowing one or more additional devices to be communicatively attached to the host. In addition, OTG may define two roles for devices: OTG A-device and OTG B-device, specifying which side supplies power to the link, and which initially is the host. The OTG A-device may be a power supplier, and an OTG B-device may be a power consumer. In the default link configuration, the A-device may act as a host with the B-device acting as a peripheral. The host and peripheral modes may be exchanged later by using a Host Negotiation Protocol (HNP).

The hardware module 140 may be used to simulate a connected keyboard or mouse and may be further configured to inject keyboard or mouse events. The software running on the hardware module 140 can then provide an interface to the keyboard simulator optimized for a meeting environment, for example, (a) by accepting voice control command through its audio board or module (e.g., voice command asking for a "next slide"), (b) enabling large step forward/step back buttons on a control panel, and/or (c) using a video conferencing camera to detect gestures, which may be processed by the video board or module in the hardware module 140. The hardware module 140 may also detect I/O or emulated I/O signals from the computing device 110 such as voice recognition, gesture detection, biometric recognition, or any other analog or digital signals emanating from the computing device 110.

Figure 2:
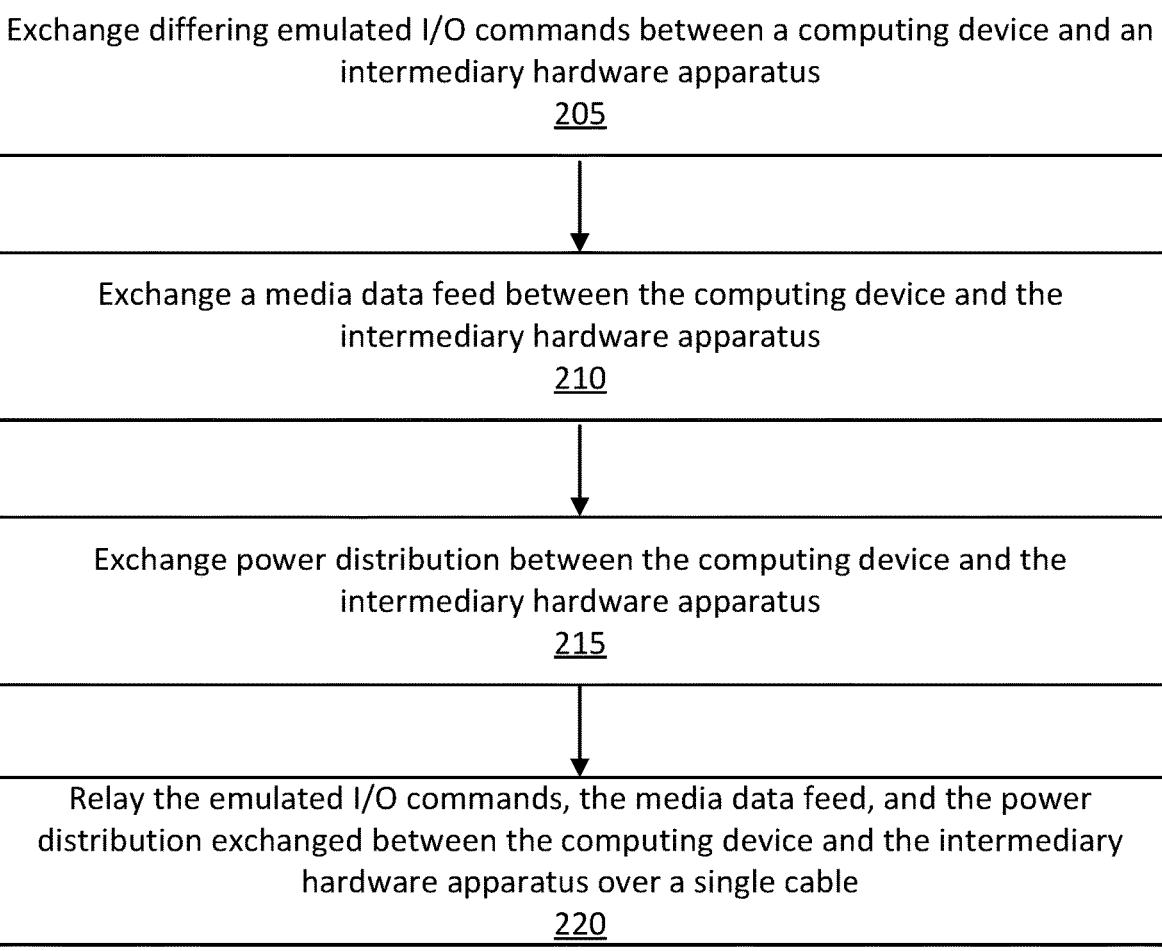
FIG. 2 illustrates a method for facilitating control and communication between a computing device and a presentation system in accordance with one exemplary implementation.

FIG. 2 illustrates an exemplary method for facilitating control and communication between a computing device and a presentation system in accordance with one exemplary implementation. In one exemplary implementation, the hardware module 140 and the computing device 110 start a method 200 that includes the steps of exchanging a number of differing emulated I/O commands (step 205), exchanging a media data feed (step 210), exchanging power distribution signals (step 215), and relaying the emulated I/O commands, the media data feed, and the power distribution exchanged between the computing device and the intermediary hardware apparatus over a single cable (step 220). Additionally, the hardware module 140 and computing device may exchange non-emulated I/O commands, media data, and power. In some examples, the method may end when the single cable is disconnected. In some examples, hardware module 140 may equipped to exchange each of these signals without additional software due to the hardware architecture of the hardware module 140.

As previously stated, the method may also include the steps of emulating a plurality of differing non-emulated I/O commands received by the intermediary hardware module 140, where the resulting emulated I/O commands include at least one of a keyboard protocol, a mouse control protocol, a voice activation control protocol, a video gesture detection control protocol, or a touch screen input protocol. The method may also include providing remote-control access to the intermediary hardware module 140 over a wireless network interacting with the intermediary hardware module 140. In some embodiments, the hardware module 140 may provide a source of power to the computing device 110 while receiving media and emulated or non-emulated I/O signals wirelessly from the computing device 110.

Figure 3:
FIG. 3 illustrates an embodiment of a cable pinout that may correspond to an example single cable as illustrated in FIG. 1 in accordance with one exemplary implementation.

FIG. 3 illustrates an exemplary cable pinout 300 corresponding to the single cable 135 in FIG. 1. In FIG. 3, various differential pair Tx/Rx ports are illustrated along with multiple power and ground return sections. Specifically, FIG. 3 illustrates a cable providing four Tx/Rx connections (A2/B11, A3/B10, A10/B3, and A11/B2) and two power dispersion connections (A4/B9, A9/B4, A1/B12, and A12/B1).

Figure 4:
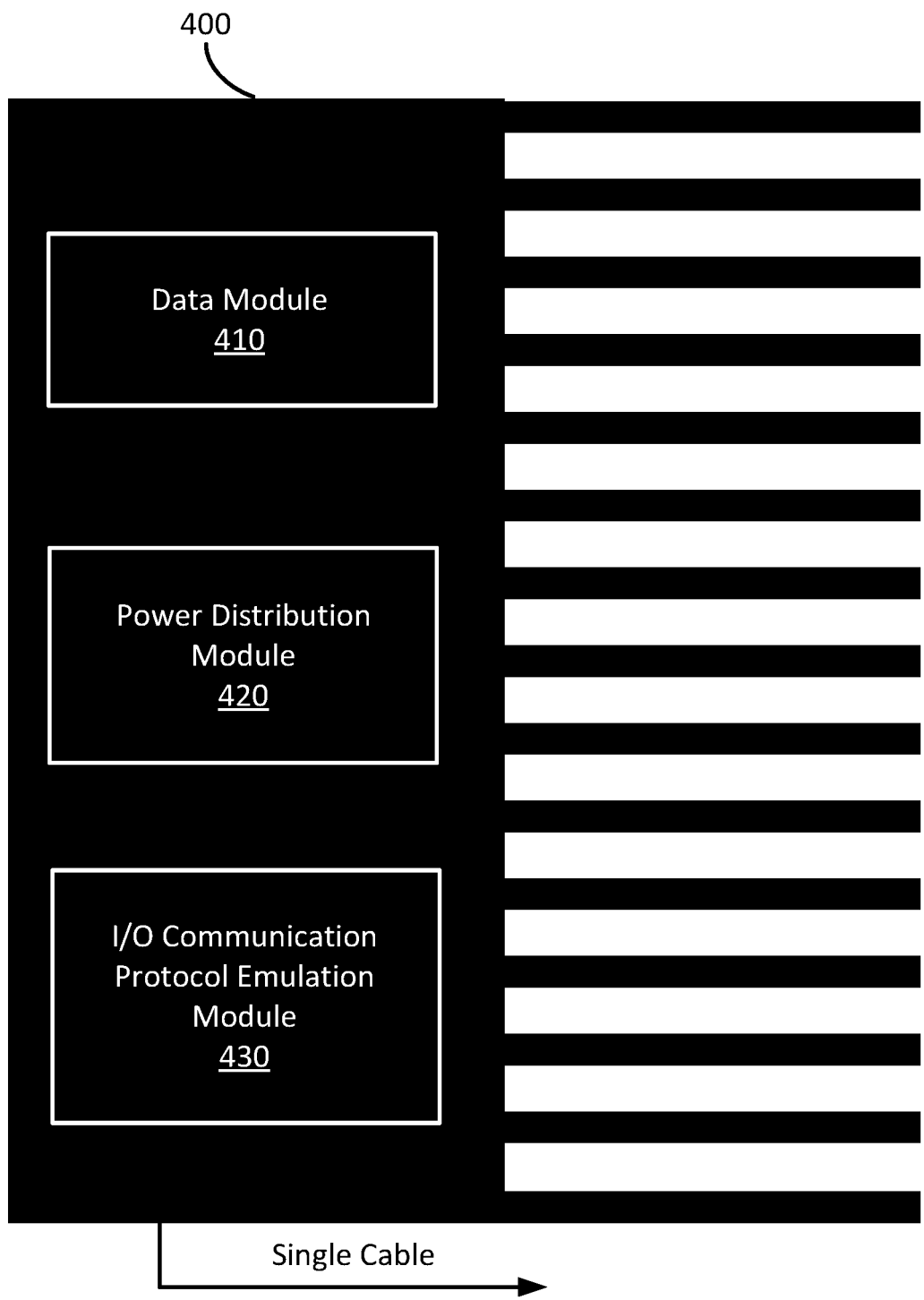
FIG. 4 illustrates a hardware interface module with a heat sink in accordance with one exemplary implementation.

FIG. 4 illustrates a hardware module 400. In one exemplary implementation, the hardware module 400 includes (a) a data module 410 configured to communicate an audio/video (A/V) data feed (media data 125) between the hardware module 400 and a computing device 110, in addition to relaying the audio/video data feed (media data 125) to the presentation apparatus 155 (b) a power distribution module 420 configured to supply power to the computing device 110, and (c) an I/O communication protocol emulation module 430 configured to emulate a number of I/O communication protocols exchanged between the hardware module 410 and the computing device 110. In one implementation, each of the data module 410, power distribution module 420, and I/O communication protocol emulation module 430 may interact with the computing device over a single cable. In one embodiment, the data module 410 may be configured to exchange data between the hardware interface module and the computing device 110 at a rate of at least 10 Gigabits per second (Gbps) over the single cable, and in some embodiments of at least 40 Gigabits per second. The high data rates that the hardware interface module 400 can tolerate reflect the high video and audio rates (such as HDMI, 4K, and other video standards), and may allow multiple group members 150 to access the hardware module 400 via the computing device 110 or over a wireless connection directly to the hardware module 400. The data rate may also allow the hardware module 400 to stream high-quality video from the internet, extract and/or deliver large files (including media files) to the presentation apparatus 155 (such as by a thumb drive or locally saved file), exchange emulated I/O or standard I/O commands, and generally provide a seamless presentation environment.

An exemplary I/O command may be generated by a keyboard, mouse, touch screen command, gesture command, etc. from a computing device 110, while an exemplary emulated I/O command may be generated by either the local computing device 110 under control of a remote computer, or returned to the computing device 110 by the hardware module 400 having been processed by the I/O communication protocol emulation module 430. In either instance, the hardware module 400 may either accept emulated I/O 120 or convert a non-emulated I/O 115 into emulated I/O 120 and relay the I/O commands to the presentation apparatus 155 such that the presenter 105 interactions with the computing device 110 are reflected on the display and in the audio of the presentation apparatus 155. Additionally, the media data 125 (e.g., display and/or audio), and I/O 115 or emulated I/O 120 may each be relayed back to the computing device 110 by the hardware module 400.

In one implementation, the hardware module 400 may be configured to exercise control over the computing device 110 through a second computing device in a wireless or wired connection with the hardware module 400. In this instance, each of the media data 125, I/O 115 or emulated I/O 120 may be directly transmitted to the hardware module 400 and subsequently relayed to one or both of the computing device 110 and the presentation apparatus 155.

Figure 5:
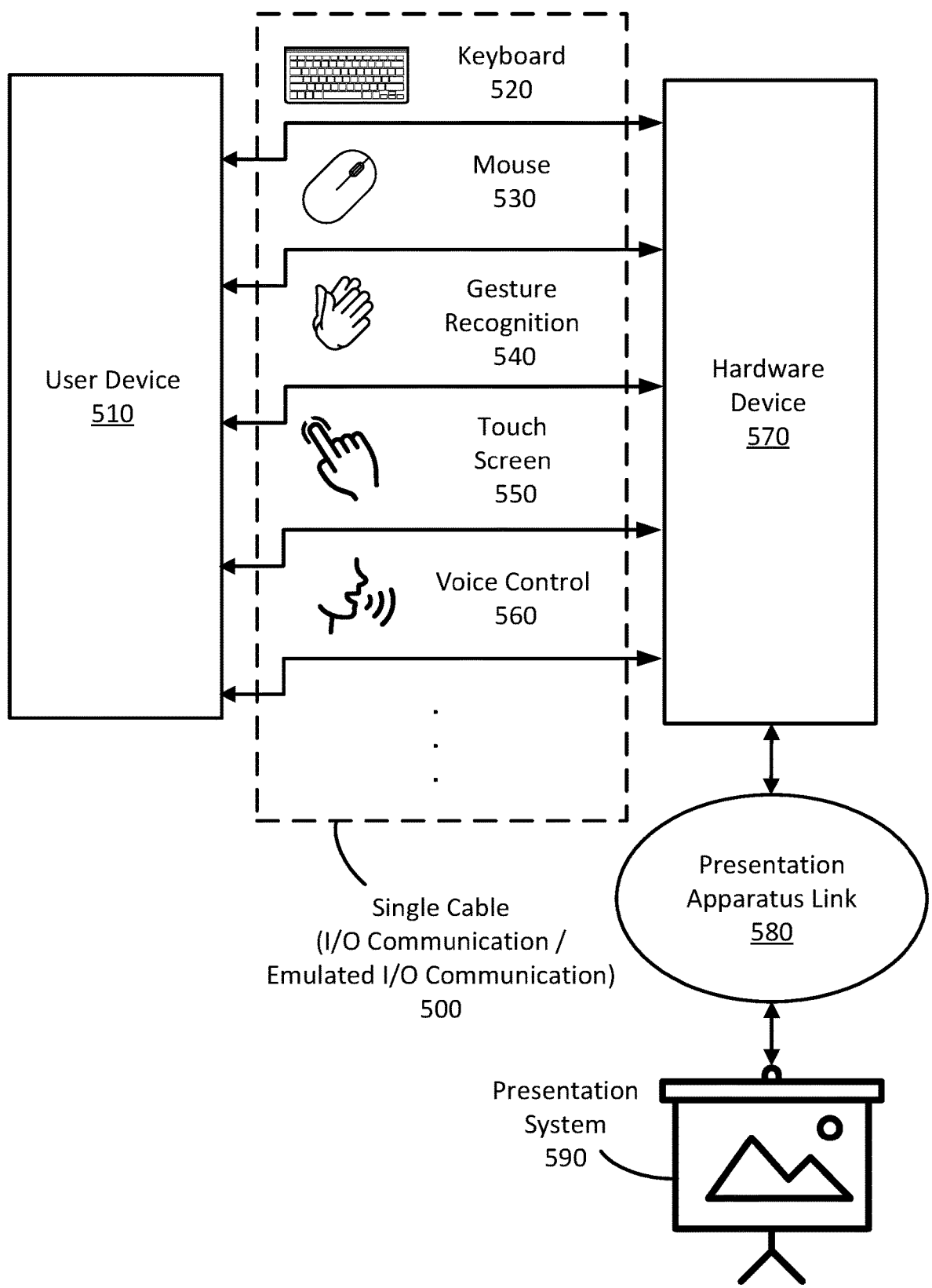
FIG. 5 illustrates a system for facilitating control and communication between a user device and a presentation system in accordance with one exemplary implementation.

FIG. 5 illustrates a system for facilitating control and communication between a user device 510 and a presentation system 590 in accordance with one exemplary implementation. The system may include a user device 510, a cable 500, a hardware device 570, presentation apparatus link 580, and a presentation system 590.

The user device 510 may be a desktop computer, laptop computer, a mobile phone device, a tablet computer, or any other form of computing device in accordance with the previously described capabilities referenced. In particular, FIG. 5 details some of the I/O and emulated I/O signals that may be communicated between the user device 510 and the hardware device 570. The hardware device 570 may be identical or similar in functionality to the hardware module 140 illustrated in FIG. 1. In one implementation, the cable 500 may be implemented as a USB-C cable. The hardware device may communicate with the presentation system through a wired or wireless connection. The presentation system 590 may be implemented as a large LCD auxiliary or external device, digital projector, or other device or system that may be used to display a presentation to an audience.

As illustrated in FIG. 5, the hardware device 570, through use of the cable 500, exchanges I/O communications and emulated I/O communications with the user device 510. The emulated I/O data may include at least one of an I/O protocol exchanged between the hardware device 570 and the user device 510, including a keyboard protocol 520, a mouse protocol 530, a voice activation control protocol 560, a video gesture detection control protocol 540, or a touch screen input protocol 550. As previously discussed, these signals may be generated directly from the user device 510 and constituting genuine I/O signals such as the signals depicted in I/O 115. Alternatively, a user may control the user device 510 remotely, in which case the user device 510 would generate its own emulated I/O signals such as emulated I/O signals 120. The hardware device 570 may generate emulated I/O signals 120 that can be exchanged with the user device 510 or the presentation apparatus 155. Additionally, users may be allowed to log in to the hardware device 570 directly via wired or wireless connections which may also result in the single cable I/O or emulated I/O connections 500 depicted in FIG. 5. Any other forms of I/O such as temperature detection, power flow information, etc. may be included in the I/O signals.

Figure 6:
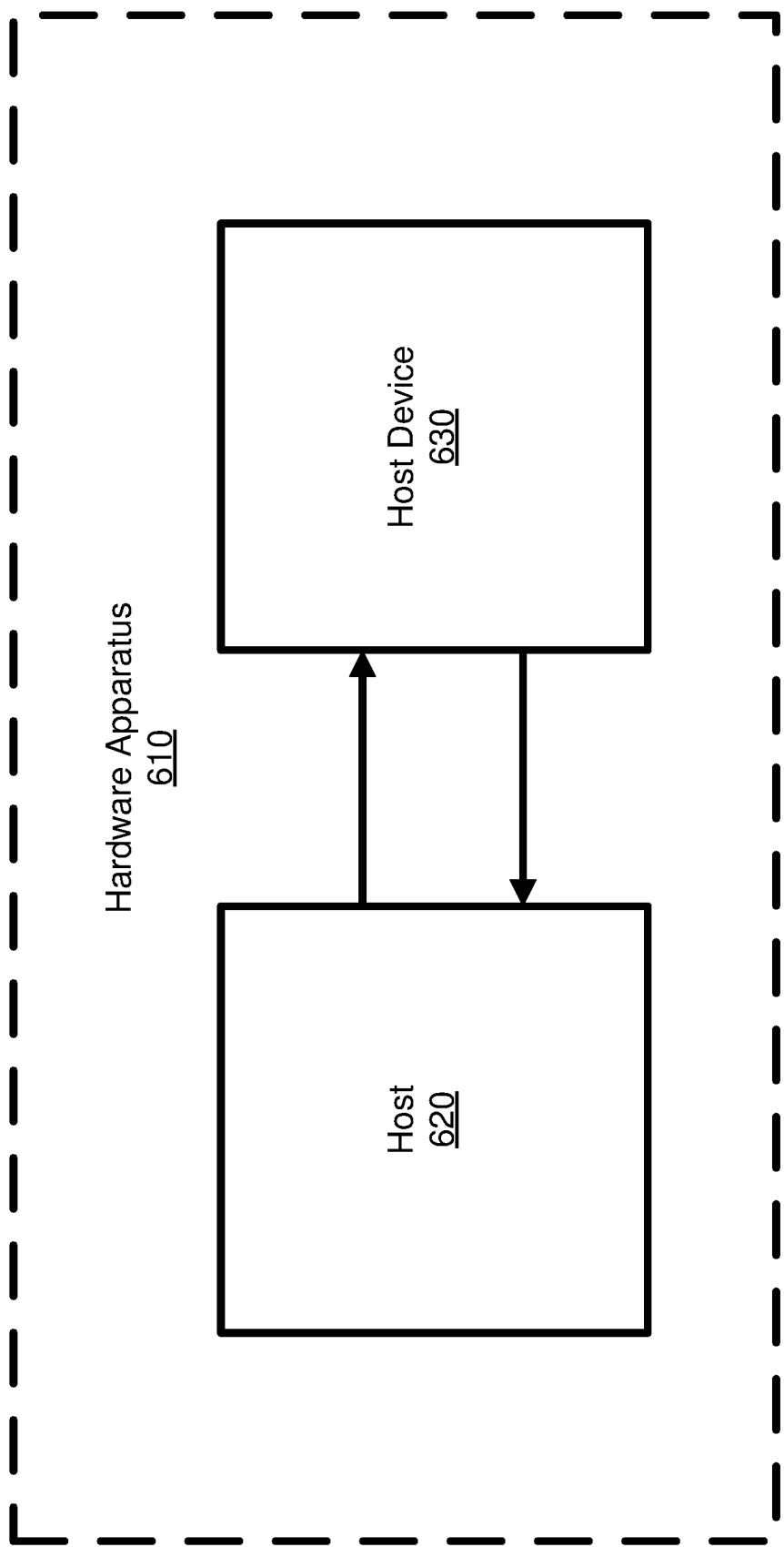
FIG. 6 illustrates a hardware module for communicating with a computing device and a presentation system with the capability to act as a host or a host device in accordance with one exemplary implementation.

FIG. 6 illustrates a hardware apparatus 610 for communicating with a computing device and a presentation system with the capability to act as a host 620 or a host device 630 in accordance with one exemplary implementation. Based on the configuration selected, the system becomes scalable to act as a host 620 or a host device 630 is enabled through use of OTG technology as previously described. Host device 630 may include any type of router or node that forwards information packets to other devices (e.g., a device that implements an IP protocol). Comparatively, host 620 may represent any device that is an endpoint for communication.

Figure 7:
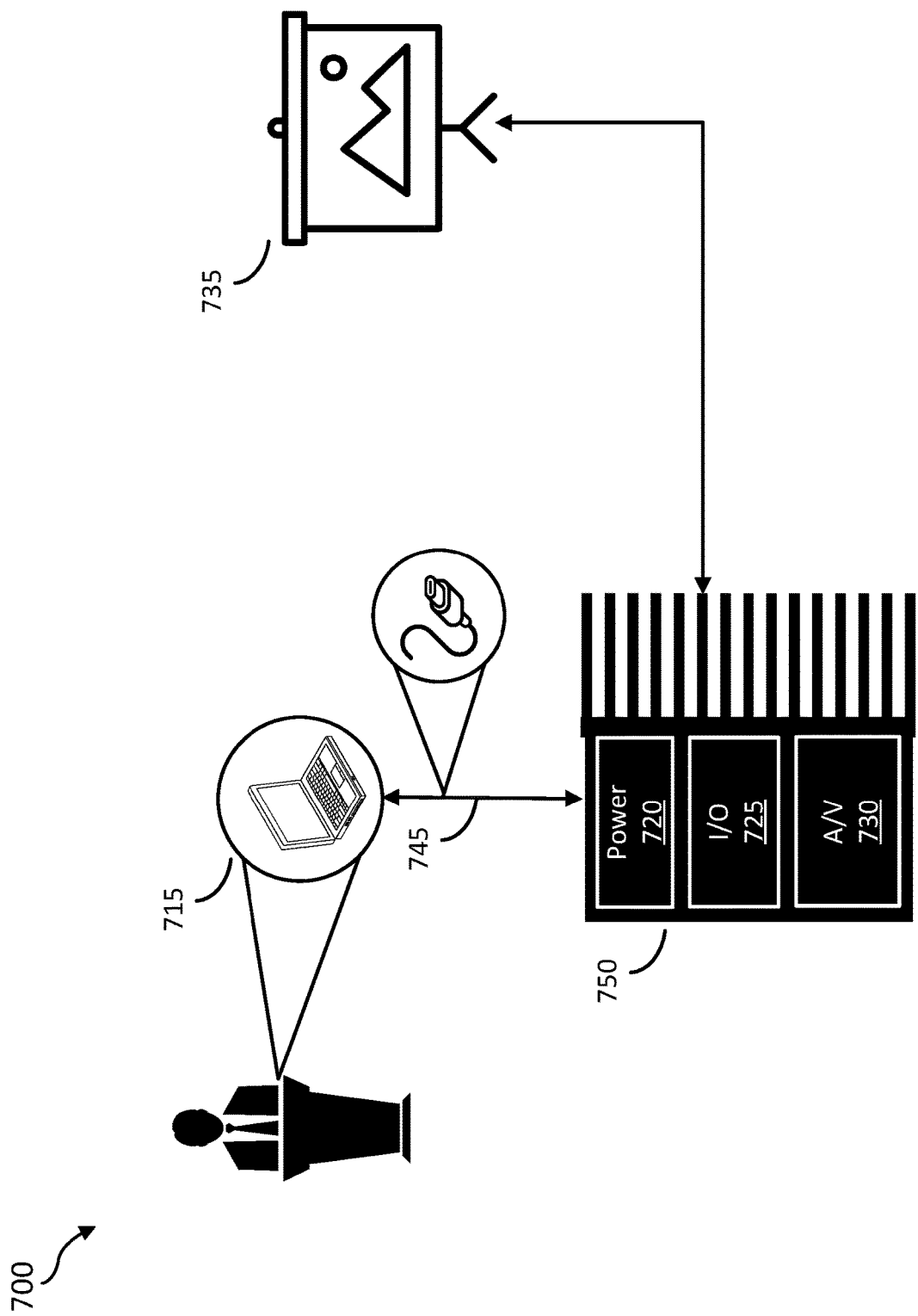
FIG. 7 illustrates a method for load management in accordance with one exemplary implementation.

FIG. 7 is a diagram of an exemplary presentation environment 700. In FIG. 7, a speaker is depicted as displaying a presentation from a computing device 715 to a presentation system 735. Between the computing device 715 and the presentation system 735 is a hardware apparatus 750 relaying power 720, I/O and emulated I/O commands 725, and an audio/visual feed 730 between the computing device 715 and the presentation system 735. In this embodiment, the presenter is communicating with the hardware apparatus 750 via a wired connection with the hardware apparatus 750 to exchange each of the power/data signals. Thus, for example, at the beginning of the presentation, the speaker may simply plug a single cable 745 into computing device 715 to provide power to computing device 715, to relay audio/visual data to presentation system 735, and to provide I/O commands (including, e.g., emulated I/O commands for controlling the presentation).

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the subsystems and/or modules described herein may transform data, physical devices, and/or representations of physical devices from one form to another. For example, one or more of the subsystems and/or modules recited herein may receive a biopotential signal generated by a human body via a compliant electrode, transform the biopotential signal into a correlated result for determination of a facial movement, output a result of the transformation to one or more electronic devices, use the result of the transformation to modify a displayed image, and/or store the result of the transformation. Additionally or alternatively, one or more of the subsystems and/or modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
   a hardware module disposed between a computing device and a presentation system, the hardware module and the computing device each being configured to exchange a signal, the signal comprising:
   media data; and
   emulated input/output (I/O) data, wherein the emulated input/output (I/O) data is converted from standard I/O data;
   the hardware module being further configured to support the conversion of a plurality of different I/O communication protocols for different I/O forms and to provide power distribution to the computing device, the signal and power distribution being communicated between the hardware module and the computing device over a single cable.

2. The system of claim 1, further comprising a video conferencing (VC) system exchanging the media data and I/O data with the computing device, the media data and the emulated I/O data being further communicated between the computing device and the hardware module over the signal.

3. The system of claim 1, the hardware module being further configured to exchange a second signal with the presentation system comprising second media data.

4. The system of claim 3, wherein the second signal comprises at least one of a display feed or an audio feed.

5. The system of claim 1, the signal further comprising non-emulated I/O data.

6. The system of claim 1, wherein the plurality of different I/O communication protocols exchanged between the hardware module and the computing device comprises at least one of a keyboard protocol, a mouse protocol, a voice activation control protocol, a video gesture detection control protocol, or a touch screen input protocol.

7. The system of claim 1, wherein the hardware module provides power distribution to the computing device and exchanges the signal with the computing device in response to being connected to the computing device.

8. The system of claim 1, the hardware module being further configured to exchange its role between being a host and being a host device.

9. A method comprising:
   exchanging a plurality of differing emulated input/output (I/O) commands between a computing device and an intermediary hardware apparatus, wherein the emulated input/output (I/O) commands are converted from standard I/O commands;
   converting a plurality of different I/O communication protocols for different I/O forms;
   exchanging a media data feed between the computing device and the intermediary hardware apparatus;
   exchanging power distribution between the computing device and the intermediary hardware apparatus; and
   relaying the plurality of emulated I/O commands, the media data feed, and the power distribution exchanged between the computing device and the intermediary hardware apparatus over a single cable.

10. The method of claim 9, further comprising exchanging a plurality of differing non-emulated I/O commands received by the intermediary hardware apparatus.

11. The method of claim 9, further comprising exchanging media data and I/O commands between a video conferencing (VC) system and the computing device.

12. The method of claim 9, further comprising exchanging media data and the emulated I/O commands between a video conferencing (VC) system and the computing device and further configured to exchange the media data and the emulated I/O commands with a presentation system.

13. The method of claim 9, wherein the plurality of different I/O communication protocols comprises at least one of a keyboard protocol, a mouse control protocol, a voice activation control protocol, a video gesture detection control protocol, or a touch screen input protocol.

14. The method of claim 9, further comprising providing remote-control access to the intermediary hardware apparatus over a wireless network interacting with the intermediary hardware apparatus.

15. The method of claim 9, further comprising exchanging the role of the intermediary hardware apparatus between being in a host state and being in a host device state.

16. A device comprising:
   a data module configured to communicate an audio/video (A/V) data feed between the device and a computing system;
   a power distribution module configured to supply power to the computing system; and
   an input/output (I/O) communication protocol emulation module configured to:
   convert a plurality of different I/O communication protocols for different I/O forms; and
   emulate the plurality of I/O communication protocols exchanged between the device and the computing system, wherein the plurality of I/O communication protocols include emulated I/O communication protocols;
   wherein each of the data module, the power distribution module, and the I/O communication protocol emulation module interact with the computing system over a single cable.

17. The device of claim 16, further comprising a wireless communication module configured to provide direct access to the device over a wireless network.

18. The device of claim 16, wherein the device supplies power to the computing system, communicates the A/V data feed between the device and the computing system, and emulates the plurality of I/O communication protocols in response to the single cable being connected to the computing system.

19. The device of claim 16, the data module and the power distribution module comprising a plurality of transmit/receive (Tx/Rx) data connection functionalities and a plurality of power distribution connection functionalities.

20. The device of claim 16, further comprising a data standard capability configured to exchange the role of the device between being a host and being a host device.

* * * * *